Jan. 28, 1969  K. STEINS  3,424,296
ROPE DRIVEN BELT CONVEYORS
Filed March 31, 1967 Sheet 1 of 4

INVENTOR
KARLFRIED STEINS
BY
Stevens, Davis, Miller & Mosher
ATTORNEYS

INVENTOR
KARLFRIED STEINS
BY
ATTORNEYS

INVENTOR
KARLFRIED STEINS
BY
Stevens, Davis, Miller & Mosher ATTORNEYS

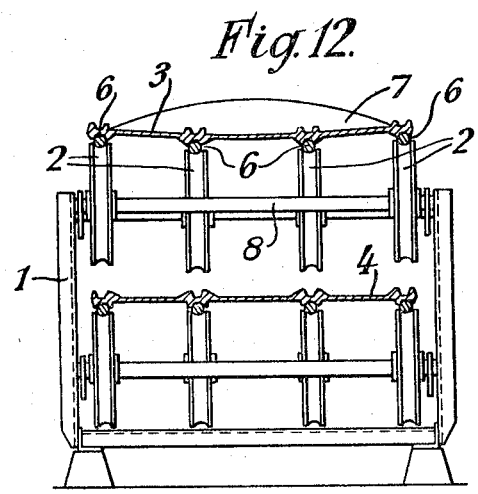
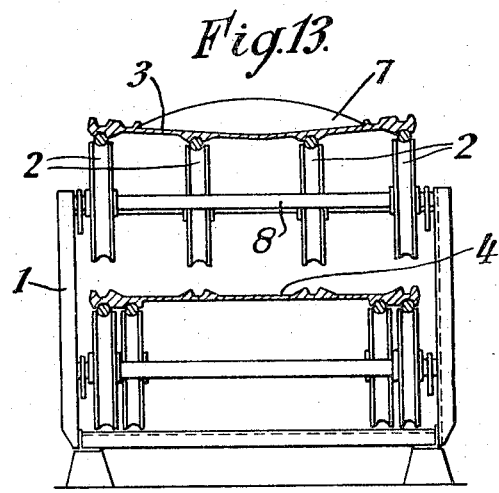

United States Patent Office 3,424,296
Patented Jan. 28, 1969

3,424,296
ROPE DRIVEN BELT CONVEYORS
Karlfried Steins, Oberhausen-Sterkrade, Germany, assignor to Cable Belt Limited, Inverness, Scotland, a British company
Filed Mar. 31, 1967, Ser. No. 627,532
Claims priority, application Germany, Apr. 9, 1966, G 46,565
U.S. Cl. 198—191    8 Claims
Int. Cl. B65g 15/08, 15/60

ABSTRACT OF THE DISCLOSURE

A rope driven belt conveyor comprising a belt supported adjacent its edges by ropes which also drive the belt, has more than one such rope adjacent each edge, the ropes adjacent each edge of the belt forming a group between which the load is distributed substantially equally by load compensating means.

---

This invention relates to rope driven belt conveyors in which the belt, instead of being directly supported on idlers is supported and driven by ropes, the belt resting on the ropes which are in turn supported by sheaves.

Such conveyors are recommended, on grounds of economy, for conveying materials over a distance of more than one kilometre, and especially where the run of the conveyor involves considerable variations of height exceeding, for example, one hundred metres. Assuming that, as is customary, a single rope is used adjacent each longitudinal edge of the conveyor belt, the cross section of the ropes for any given conveyor depends on the amount of material to be conveyed and on the length and lift of the conveyor. To maintain an adequate safety factor, therefore, the rope cross-section must be increased with increasing loads and with increasing length and lift. However, the problem of manually splicing the ends of the ropes, which splicing is necesary because the ropes are in the form of endless loops, becomes greater with increase in cross section, and such splicing is not practical with ropes exceeding a certain cross-section.

The use of more than one rope on each side of the centre line of the conveyor belt suggests itself as a means of reducing rope loading without calling for ropes of undesirably great cross-section but the multiplication of the number of ropes is useless unless the load can be substantially equally distributed between them.

Without special provision for distributing the load evenly, there is likely to be a wide variation between the loading of individual ropes, one reason for this being the irregular load distribution across the width of the belt. The angle of repose of the conveyed material produces a cross-section of the load which, in its upper part, is substantially of parabolic form.

It is the object of the present invention to provide a conveyor in which substantially equal distribution of load between two or more ropes on each side of the belt centre line is obtained.

According to the present invention, in a rope driven belt conveyor comprising a belt and ropes each of which serves both to support and to drive the belt, the ropes being guided and supported by rope sheaves at supporting stations spaced along the length of the conveyor, there is provided, on each side of the longitudinal centre line of the belt, a group of at least two ropes, and load-compensating means are provided to effect substantially equal distribution of the load between the ropes of each group.

In the accompanying drawings, which show some exemplary embodiments of the invention:

FIGURE 12 is a view similar to FIGURE 1 but showing a different distribution of the ropes; and FIGURE 13 is a view similar to FIGURE 12 but showing a modification.

Figure 1:
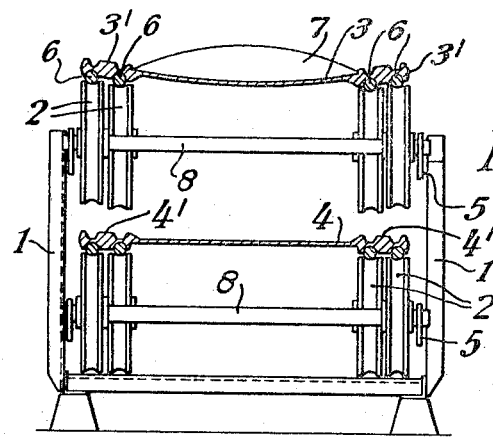
FIGURE 1 is a cross-section of a conveyor according to the invention having groups of two ropes and showing both the upper carrying and the lower (return) run.
Figure 2:
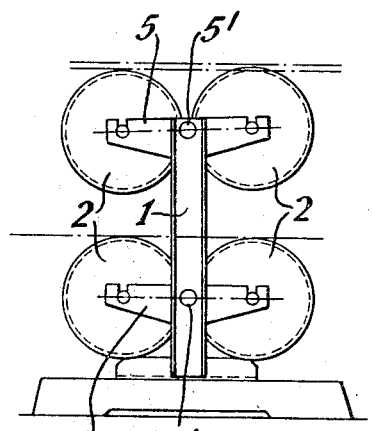
FIGURE 2 is a side elevation of a supporting station of the conveyor shown in FIGURE 1.
Figure 3:
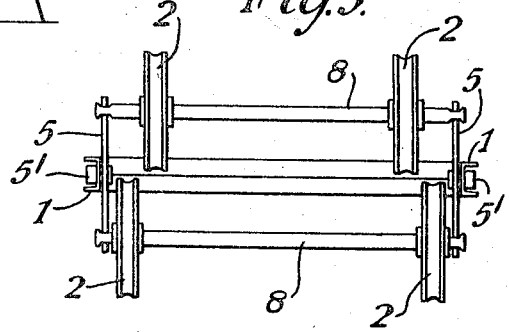
FIGURE 3 is a plan view of the supporting station shown in FIGURE 2.

Referring to FIGURES 1 to 3, the supporting station comprises a frame including upright supports 1, the supporting stations being distributed at predetermined intervals along the length of the conveyor. Rope sheaves 2 for the ropes 6 supporting the upper and lower runs 3 and 4 respectively of the conveyor belt are disposed in pairs on rockers 5 pivoted at 5' on the supports 1. As will be seen, there are two groups of ropes each consisting of two ropes 6, each group of ropes engaging the belt adjacent one longitudinal edge, so that the material 7 forming the load on the belt lies between the two groups. The longitudinal belt edges, indicated at 3' and 4' respectively on the upper and lower runs are thickened and are provided on both sides of the belt, with pairs of longitudinal grooves for engagement with the ropes 6.

Each pair of sheaves 2 at each side of the belt comprises an outer sheave and an inner sheave so that one sheave of the pair engages one rope of a group and the other sheave engages the other rope of that group. The two outer sheaves associated with each run of the belt are mounted on a common axle 8, and the two inner sheaves are correspondingly mounted on another common axle 8, the two axles being supported one at each end of a pair of rockers 5.

Figure 4:
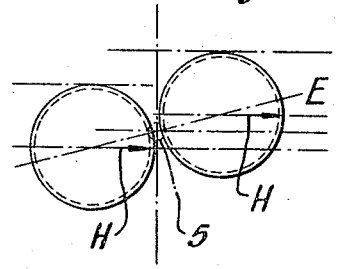
FIGURE 4 is a diagram illustrating the operation of the load compensating means.

On the upper run 4 of the belt, troughing caused by the load 7 displaces the ropes 6 of each pair one relative to the other in a vertical sense, this displacement being accommodated by inclination of the rockers 5 as shown in FIGURE 2. The inclination is shown exaggerated in FIGURE 4 in order to demonstrate the effect of forces produced by rolling resistance. This resistance produces a horizontal force H on each sheave, the two forces H being of substantially the same magnitude and acting in the same direction but, because the sheave axes and the rocker axis 5' are in a common plane E they act in opposite senses about the rocker axis 5' and substantially cancel each other.

Figure 5:
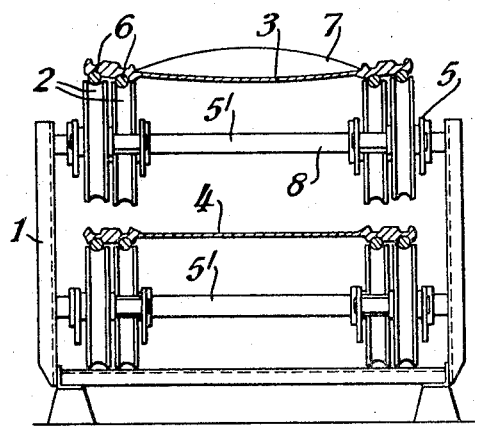
FIGURES 5 to 7 are views similar to FIGURES 1 to 3 showing a modified arrangement.
Figure 6:
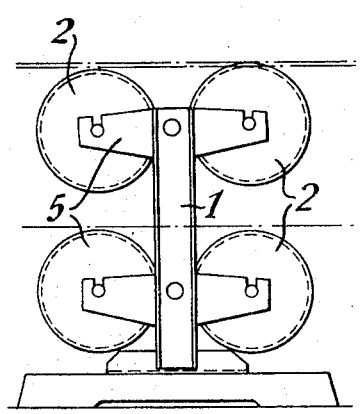
Figure 7:
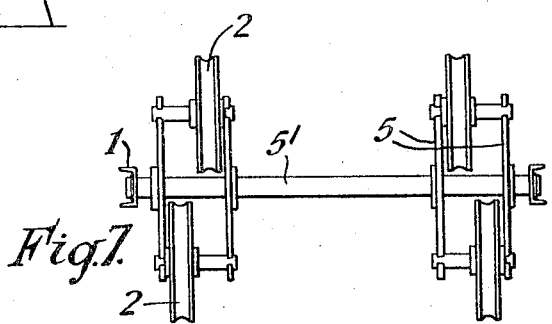

Referring to FIGURES 5 to 7, the inner sheaves 2 and outer sheaves 2 of the two pairs associated with each run of the belt, instead of being mounted on common axles 8 are mounted by means of individual short axles 8' on rockers 5 which are independent one of the other.

Figure 8:
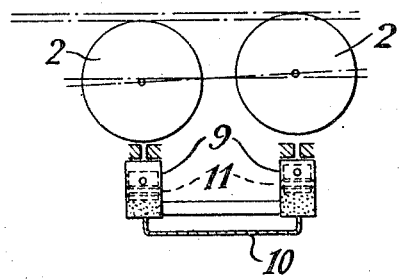
FIGURE 8 is a diagrammatic illustration of a liquid pressure load compensating means.

Instead of mounting the sheaves on rockers 5, they may be supported by pistons 11 slidable in cylinders 9 containing liquid or gas and connected one to the other by a pipe 10 (see FIG. 8) so that the loads on the two sheaves are balanced one against the other.

Figure 9:
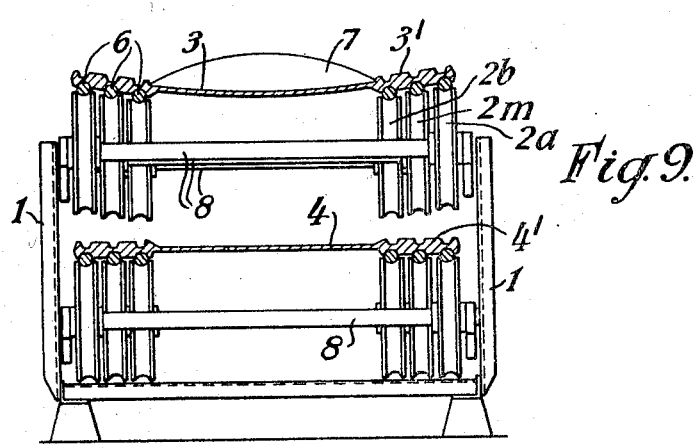
FIGURES 9 to 11 are views corresponding to FIGURES 1 to 3 but showing a conveyor having groups of three ropes.
Figure 10:
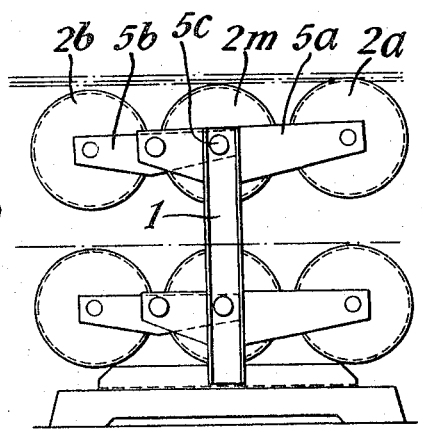
Figure 11:
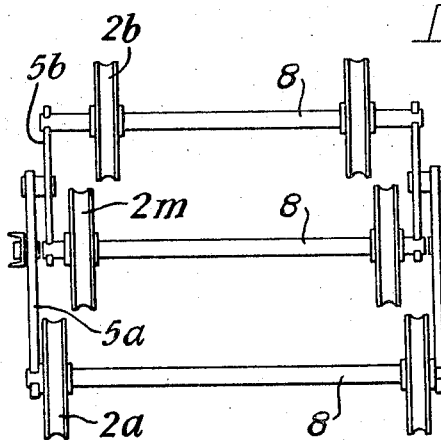

FIGURES 9 to 11 show the application of the invention to a conveyor in which each group of ropes consists of three ropes 6. At each supporting station the supports 1 carry three sheaves on each side of the centre line of the belt for each run of the belt, each set of three sheaves comprising an outer sheave 2a, an inner sheave 2b and an intermediate sheave 2m. Each pair of sheaves 2a, each pair of sheaves 2b and each pair of sheaves 2m are mounted respectively on an axle 8. Each axle 8 carrying a pair of sheaves 2a is mounted between two rockers 5a which are pivoted at 5c on the supports 1, and the axles 8 carrying the pairs of sheaves 2b and 2m respectively are mounted between opposite ends of rockers 5b pivotally mounted on the ends of the rockers 5a opposite to the sheaves 2a. The rockers 5b have arms of equal length, but the arms of the rockers 5a which support the sheaves 2a are longer than the arms of those rockers which support the rockers 5b.

In a rope driven belt conveyor having a group of two or more ropes on each side of the centre line of the belt, the maximum point loading of the belt can be reduced, for a given belt width and total load, by positioning some of the ropes inwardly of the belt edge and thus reducing the unsupported width of the belt. FIGURE 12 shows a conveyor having four ropes 6 substantially equally spaced across the belt width and supported by sheaves 2 mounted substantially in the manner shown in FIGURES 1 to 3. In FIGURE 12, the substantially equal spacing of the ropes 6 is maintained on both the carrying run 3 and the return run 4 of the belt but, since the belt is loaded only on the carrying run, there is less need to provide for reduction of the point loading on the belt on the return run.

Consequently, an arrangement such as is shown in FIGURE 13 may be used, in which the ropes 6, although substantially equally spaced across the belt on the carrying run, are arranged close together adjacent the edges of the belt on the return run. The advantage of this arrangement is that on the side of the belt 3, 4 which is uppermost on the carrying run, the thickened portions in which the grooves to receive the ropes are formed do not have to be provided in the portion of the belt on which the load actually rests, but can be provided at the edges.

It will be evident that the arrangements shown in FIGURES 12 and 13 may be used in conveyors in which the groups of ropes each include three or more ropes.

The load compensating means according to the invention ensure that a load acting vertically downwardly on the belt is substantially uniformly distributed between the individual ropes. The distribution may be disturbed where the conveyor belt travels in an upwardly inclined path due to slip between the ropes and the belt and to resulting changes in the tension in the ropes. To avoid such slipping the belt is provided with grooves to receive the ropes as described and shown in the drawings, but it will be understood that such grooves are not necessary in all cases, and the invention includes rope driven belt conveyors in which such grooves are not provided.

Whilst, in the embodiments of the invention described and illustrated, load compensating means have been provided on both the carrying run and the return of the belt, it may be possible to dispense with such load compensating means on the return run.

I claim:
1. A rope driven belt conveyor comprising a belt, a belt supporting and driving rope group means on each side of the longitudinal center line of the belt, each said rope group means comprising at least two ropes arranged side-by-side, a plurality of supporting stations spaced along the length of the conveyor, each said station comprising support means, a plurality of rope sheaves, and load compensating means operatively mounting said sheaves on said support means to engage with and support the ropes of each of said rope groups so as to effect substantially equal distribution of the conveyor load between the ropes of that group.

2. A rope driven belt conveyor according to claim 1 wherein the compensating means act between the rope supporting sheaves engaging each rope of a group.

3. A rope driven belt conveyor according to claim 2 wherein said compensating means further comprises a plurality of shaft means each of which has mounted thereon a rope sheave from one side of the center line of the belt and the corresponding rope sheave on the other side of the center line of the belt.

4. A rope driven belt conveyor according to claim 2 wherein the load compensating means comprises rocker means pivotally mounted on said support means, said sheaves being rotatably mounted on said rocker means.

5. A rope driven belt conveyor according to claim 4 in which each group of ropes comprises two ropes and the pivot axis of each rocker and the rotational axes of the sheaves mounted thereon lie in a common plane.

6. A rope driven belt conveyor according to claim 4 in which each group of rope comprises three ropes and wherein the sheaves to support one rope on each side of the longitudinal center line of the belt are mounted each on one end of said rocker means having a fixed pivot intermediate its ends and a second rocker means pivoted intermediate its ends to the other end of said rocker means, the sheaves to support the other two ropes on each side of the longitudinal center line of the belt being mounted on the opposite ends of the second rocker means, all the pivot axes of all of said rocker means lying in a common place.

7. A rope driven belt conveyor according to claim 1 wherein the compensating means comprise interconnected fluid pressure piston-cylinder devices.

8. A rope driven belt conveyor according to claim 1 further comprising a groove provided on at least that side of the belt which is the underside of the carrying run of the conveyor to receive each of the ropes.

References Cited

FOREIGN PATENTS 768,569   2/1957   Great Britain.

RICHARD E. AEGERTER, *Primary Examiner.*